J. WHITEHEAD.
CARRIAGE.

No. 80,377. Patented July 28, 1868.

Witnesses,

Inventor,
J. Whitehead
per Munn &
Attorneys

United States Patent Office.

JOB WHITEHEAD, OF AMES STATION, IOWA.

Letters Patent No. 80,377, dated July 28, 1868.

---

IMPROVEMENT IN CARRIAGES.

---

The Schedule referred to in these Letters Patent and making part of the same.

---

TO ALL WHOM IT MAY CONCERN:

Be it known that I, JOB WHITEHEAD, of Ames Station, in the county of Strong, and State of Iowa, have invented a new and useful Improvement in Carriages; and I do hereby declare that the following is a full, clear, and exact description thereof, which will enable those skilled in the art to make and use the same, reference being had to the accompanying drawings, forming part of this specification.

The nature of my invention relates to improvements in vehicles for use on common roads, whereby it is designed to provide a cheap and simple means for propelling them by springs.

It consists in the arrangement, upon the framework of the body or box of a carriage, of one or more coiled springs, which may be wound up with a crank, and arranged to transmit motion to the axle of the hind wheels by belts, as will be more fully described on reference to the accompanying drawings, wherein—

Figure 1:
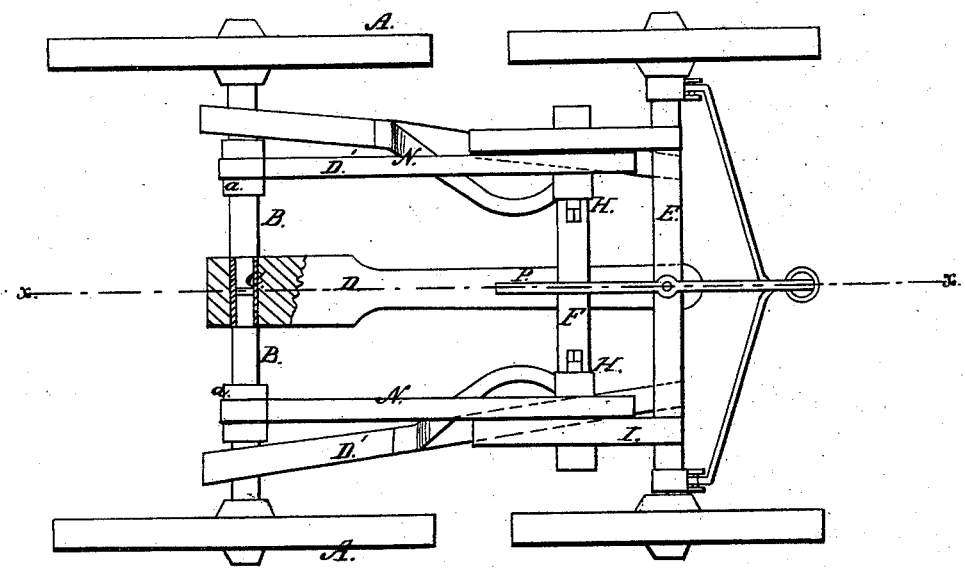

Figure 1 represents a plan view of my improvement, and

Figure 2:
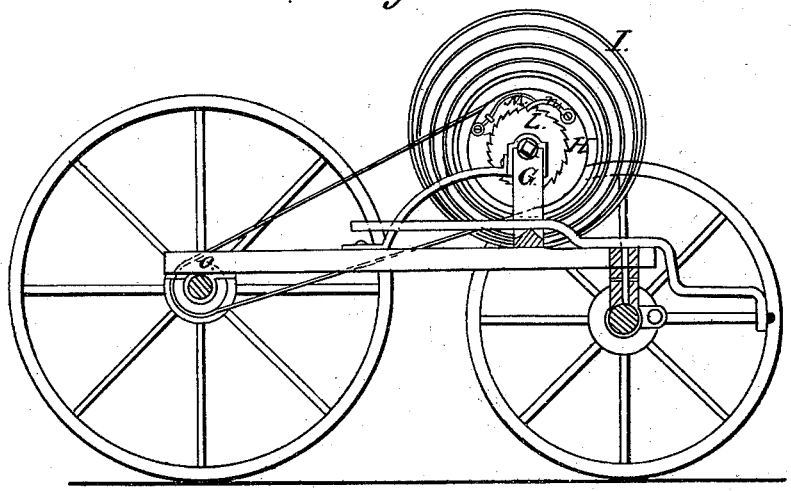

Figure 2 a longitudinal sectional elevation on the line $x\ x$ of fig. 1.

Similar letters of reference indicate corresponding parts.

The hind wheels A A are rigidly connected to the independent axles B B, the inner ends of which are supported in a bearing, C, in the rear end of the main reach D.

D' D' are braces, supported in suitable bearings on the hind axles, and rigidly fixed to the bolster E, upon the front axle, to which the reach D is also secured.

Upon the framing thus formed, a short distance in rear of the front bolster, a cross-piece, F, is secured, from which rise the vertical posts G, to support the shafts H.

I I represent flat steel springs, secured at one end to the shafts H, and at the other to the cross-piece F.

The shafts H are provided with pulleys K, ratchets L, and pawls M, and with cranks for winding up the springs.

The pulleys L are so fixed to the shafts that when they are being turned in the direction to wind up the springs, the said pulleys will not turn with the shafts, but when turned in the opposite direction, by the tension of the springs, motion is communicated to the said pulleys, and from thence to the axles of the hind wheels, by the belts N and pulleys O.

P represents a rod, pivoted to the front axle, and connected to the bent brace R, for guiding the front wheels.

For reversing the motion of a carriage, a crossed belt and loose pulleys may be arranged, together with paratus for shifting the belts, as in the ordinary method of reversing motion by belts and loose and fast pulleys; and for governing the motion in going down hill, or to prevent the springs from driving the carriage too fast, brakes may be arranged to operate against the hind wheels, in the usual manner.

I claim as new, and desire to secure by Letters Patent—

The combination of the springs I, shafts H, ratchets L, pawls M, pulleys K, with the cross-piece F and framing, and with the pulleys O and axles B, when constructed and arranged substantially as and for the purpose described.

JOB WHITEHEAD.

Witnesses:
JOHN ELLIOTT,
D. G. FERGUSON.